United States Patent

[11] 3,561,426

| [72] | Inventor | Thomas P. Wheeler |
| | | Los Gatos, Calif. |
| [21] | Appl. No | 799,839 |
| [22] | Filed | Feb. 17, 1969 |
| [45] | Patented | Feb. 9, 1971 |
| [73] | Assignee | FMC Corporation |
| | | San Jose, Calif. |
| | | a corporation of Delaware |

[54] FINES MELTER
7 Claims, 5 Drawing Figs.

| [52] | U.S. Cl. | 126/343.5 |
| [51] | Int. Cl. | F24c 1/00 |
| [50] | Field of Search | 126/343.5, 343.5A |

[56] References Cited
UNITED STATES PATENTS

| 281,500 | 7/1883 | Hannan | 126/343.5 |
| 328,714 | 10/1885 | Ralston | 126/343.5A |
| 470,822 | 3/1892 | Heide | 126/343.5AUX |
| 1,351,542 | 8/1920 | Ryan | 126/343.5 |
| 2,300,083 | 10/1942 | Worthington | 126/343.5A |

Primary Examiner—Charles J. Myhre
Attorneys—F. W. Anderson and C. E. Tripp

ABSTRACT: Finely divided frozen granules of extract such as coffee or the like are melted in an apparatus having closely spaced tubes which act as a grating to support the frozen granulated extract. A heating fluid is passed through the tubes which causes melting of the extract that is in direct contact with the tubes. As the extract is melted, the air between the surfaces of the frozen granules is released and the melted extract drips from the tubes into a catch tank.

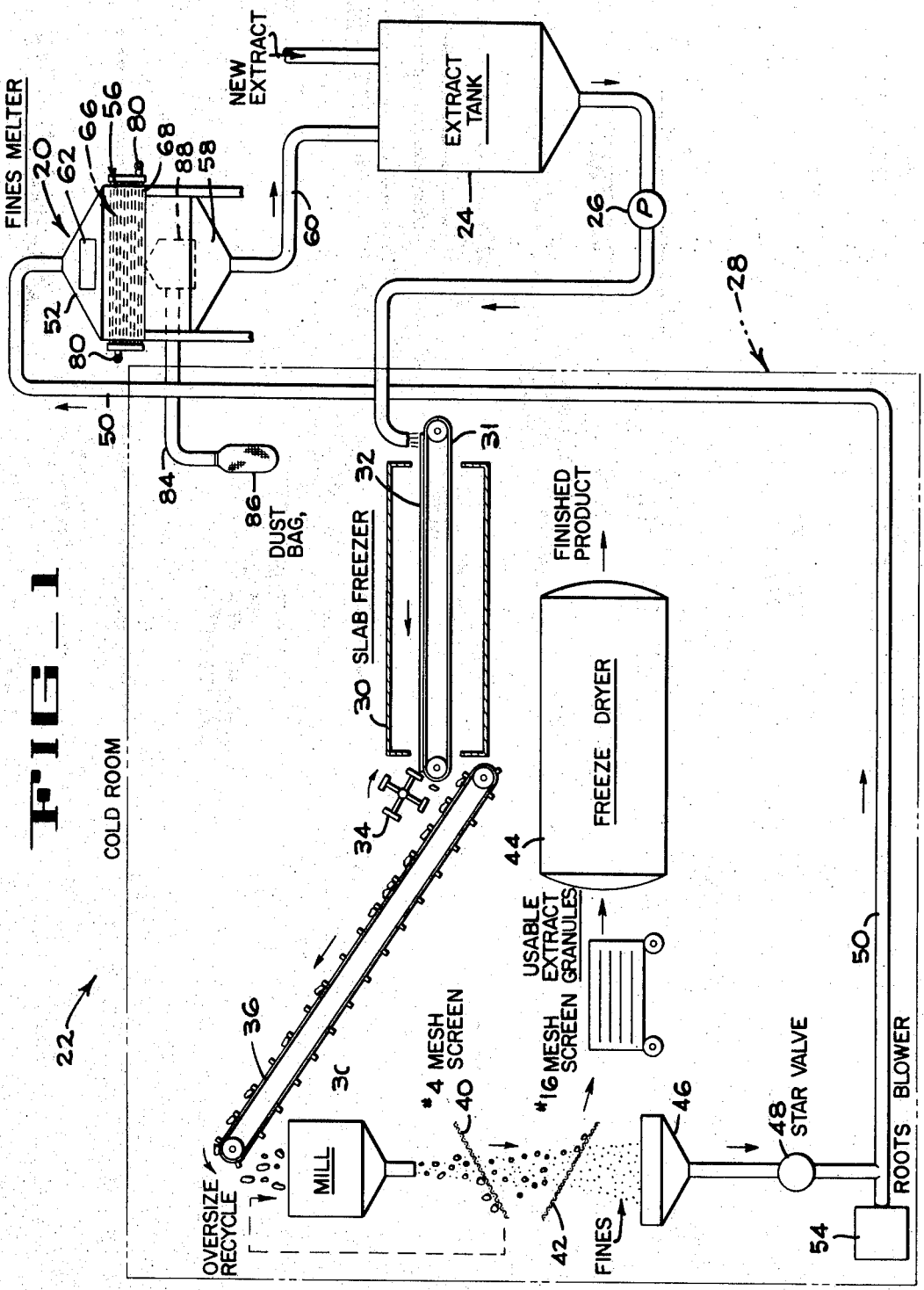

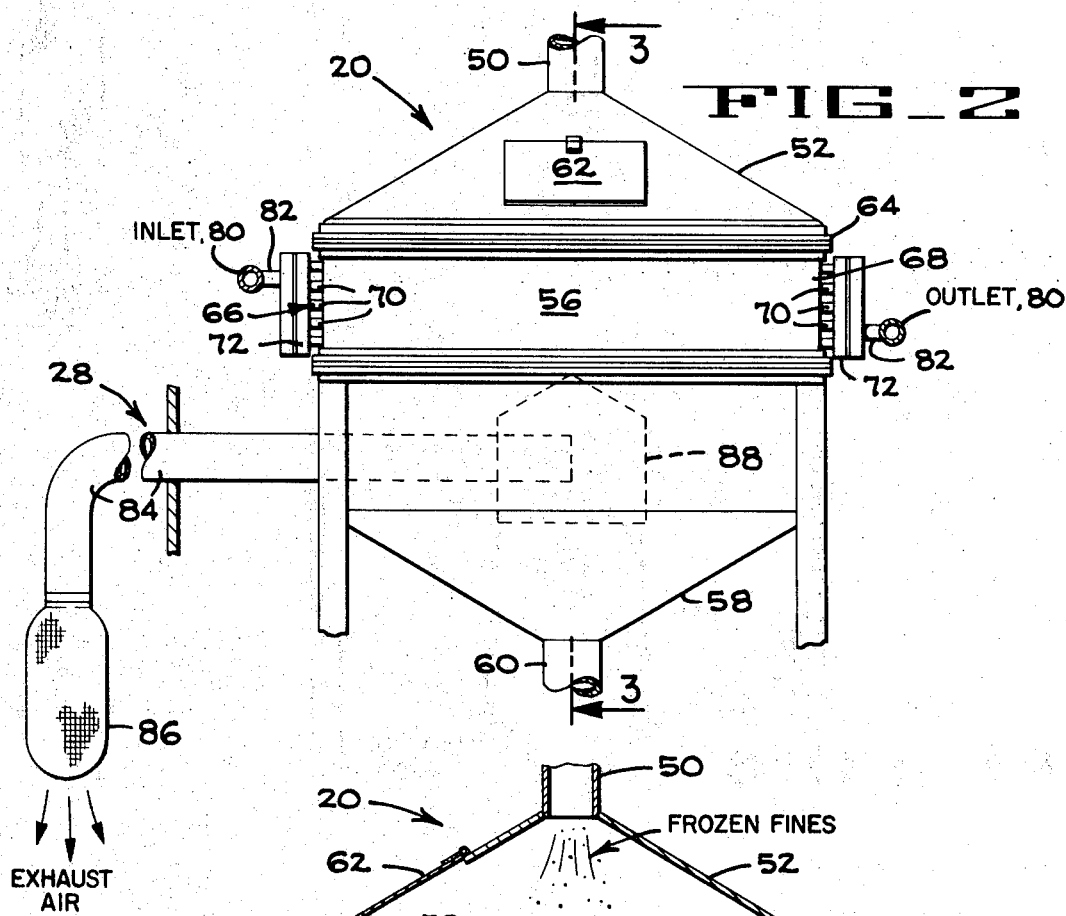
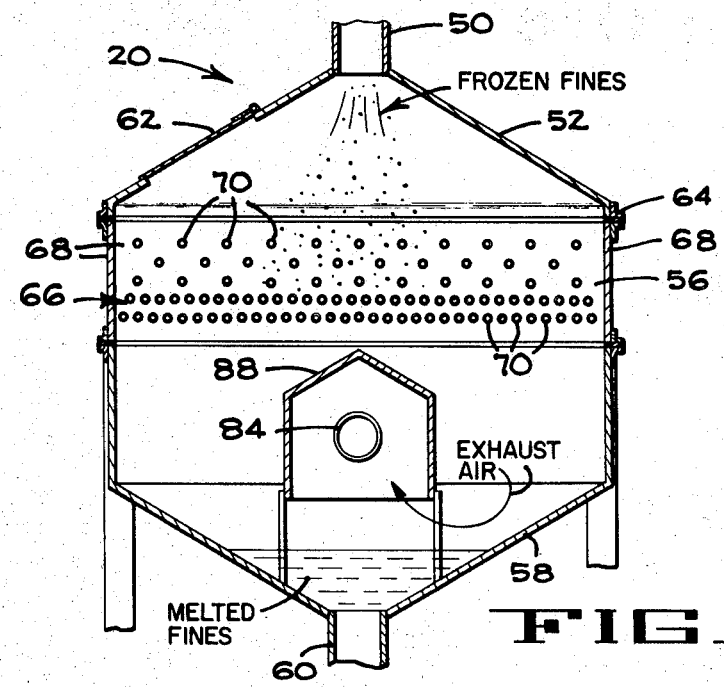

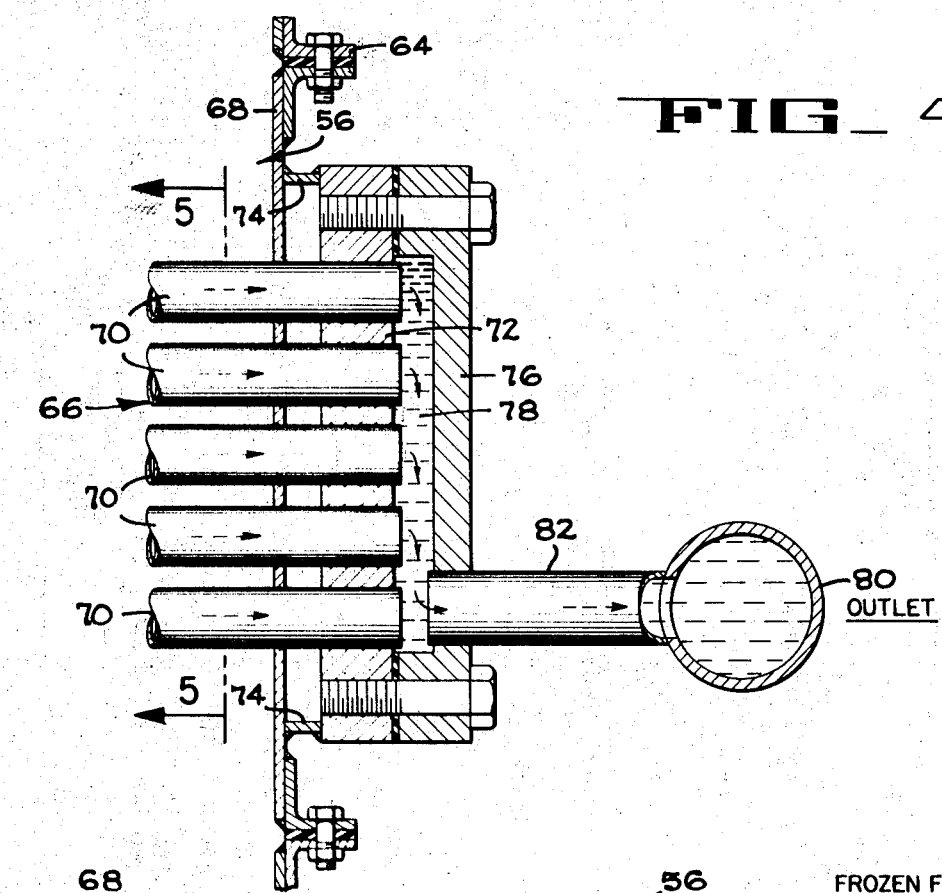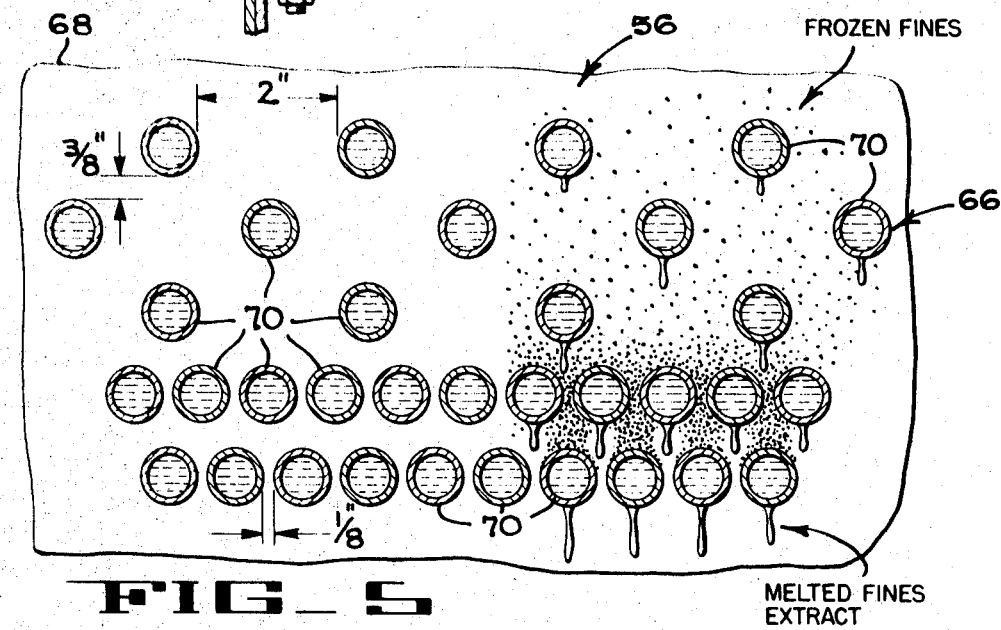

3,561,426

FINES MELTER

BACKGROUND OF THE INVENTION

Field of the Invention

The apparatus of the invention pertains to melting equipment and in particular to an apparatus for melting finely granulated frozen liquids such as coffee extract or the like.

SUMMARY OF THE INVENTION

In a system for producing coffee extract or the like, granulated frozen extract is passed over a No. 16 United States Standard wire mesh screen. The extract which passes through the screen and amounts to approximately 30 percent of the granulated extract is referred to as fines and is generally not desirable for processing into the final product. Therefore, it is necessary to remelt the frozen fines and return them to the extract tank. Because of their fine powdery consistency, the fines are difficult to handle as they tend to stick together and, having a large surface area, they tend to retain a large amount of air in their interstices. If the fines were simply dumped into the extract tank, they would form a large floating island and result in extremely slow melting.

Because of the sticky nature of the fines, it is difficult to apply heat to melt them without mixing or agitation which creates a foaming problem. Batch melting of fines in a jacketed kettle requires excessive time and considerable handling of the product. High jacket temperatures are required to accomplish melting in a reasonable time.

A further difficulty is that the extract should not be heated above 40° F. (in the case of coffee) in order to retain the flavor and quality of the product.

It is, therefore, an object of the present invention to provide a method of rapidly melting finely granulated extract on a continuous basis so that air retained in the interstices between the extract granules is permitted to escape thereby preventing foaming in the melted extract.

Another object is to provide an apparatus for rapidly melting finely granulated frozen extract on a continuous basis, which is not subject to stoppage as the extract forms a sticky mass upon partial melting.

A further object is to provide an apparatus capable of rapidly melting the frozen extract at a low temperature through conduction to maintain the quality and flavor of the extract.

BRIEF DESCRIPTION OF THE DRAWINGS

FIG. 1 is a diagrammatic elevation of an extract processing system including a fines melter constructed in accordance with the present invention.

FIG. 2 is a front elevation of the fines melter.

FIG. 3 is a vertical section of the fines melter taken on line 3–3 of FIG. 2.

FIG. 4 is an enlarged cross section of the outlet manifold shown on the right side of the fines melter of FIG. 2.

FIG. 5 is a cross-sectional view of the tube bundle taken on line 5–5 of FIG. 4, the left portion of FIG. 5 illustrating the tube arrangement whereas the right portion shows the manner in which the fines are supported and melted.

DESCRIPTION OF THE INVENTION

Extracting Processing System

The present invention relates to a fines melter 20 (FIG. 1) which forms a portion of an extract processing system 22 such as employed in the production of "instant coffee."

The system includes an extract holding tank 24 to which a supply of new extract is fed as seen in FIG. 1. The extract is pumped by means of a centrifugal pump 26 into a cold room 28 where the extract is placed on an endless belt 31 which moves through a freezer 30. The belt 31 is of the type shown in the application for U.S. Pat. of T. P. Wheeler, Ser. No. 669,916 which was filed on Sept. 22, 1967 and is assigned to the assignee of the present application. In the freezer the extract is subjected to a freezing atmosphere and, by the time it emerges from the freezer, it is frozen into slab form. As the slab 32 of frozen extract exits from the freezer 30, it is broken into chunks by a rotary slab breaker 34. A conveyor 36 transfers the chunks of frozen extract to a mill 38 which granulates the extract.

The granulated extract from the mill 38 is deposited on a No. 4 United States Standard wire mesh screen 40. The extract granules which are too large to pass through the screen 40 are recycled to the mill 38 for further granulating. The extract which passes through the screen 40 is deposited on a No. 16 U.S. Standard wire mesh screen 42 where the extract is again sifted.

The extract, which does not pass through the No. 16 screen 42, is suitable for further processing and is sent to a freeze dryer 44 for final processing. The freeze dryer 44 is of the type disclosed in U.S. Pat. No. 3,132,930 to Abbott.

The extract which passes through the No. 16 screen 42 is unsuitable for final processing and is referred to as "fines." These fines that pass through screen 42 are collected in a hopper 46 and fed to a "star" valve 48. The star valve 48 deposits the fines in a conveying line 50 which is connected to an inlet hood 52 on the fines melter 20. The fines are conveyed through line 50 in a fluid air suspension. A Roots blower 54 supplies air at the rate of approximately 4 cubic feet per minute to the 2½ inch diameter plastic line 50.

The star valve is necessary to prevent blowback into the hopper 46 and at the same time acts as a metering device. The rate at which the star valve is rotated by a motor (not shown) determines the rate at which the fines are metered into the airstream and means is provided in the drive mechanism to allow this rate to be varied.

Fines Melter

The fines melter 20 (FIG. 2) is comprised of a hood 52 which receives the extract fines through supply line 50. Below the hood is a melting section 56 mounted above a catch tank 58 which receives the melted fines. The melted fines extract is returned to the extract tank 24 through a gravity return line 60.

The hood 52 contains an access door 62 which permits cleaning and inspection of the apparatus. The fines melter 20 is primarily constructed of stainless steel to prevent corrosion and to simplify cleaning. The hood 52 is attached to the melting section 56 by means of a conventional bolted and gasketed rim 64.

The melting section 56 is comprised of a tube bundle 66 enclosed in a housing formed by side plates 68, as seen in FIGS. 2, 3 and 4. Referring to FIG. 4, heating tubes 70 pass through the side plate 68 and at each side of the housing, the tubes are mounted in a manifold 72 such that the joints are leakproof. The manifolds 72 are mounted outward from the side plates 68 on spacers 74. The manifold 72 is covered with a header cap 76 which creates a cavity 78. The heating fluid enters and exits the manifold from header pipes 80 through multiple header tubes 82. The header tubes supply and distribute the fluid to the cavity 78 which communicates with all the tubes 70 of the tube bundle 66.

Another identical manifold as described above is located at the inlet end of the tube bundle 66 as seen in FIG. 1.

FIG. 5 is a section taken across the tube bundle on line 5–5 of FIG. 4. The left portion illustrates the tube arrangement and spacing. The tube bundle 66 contains five courses of heating tubes 70. In the present embodiment, three-fourths inch outside diameter stainless steel tubes are employed in the melting section. The three upper courses are staggered as shown and are laterally spaced with approximately 2 inches between adjacent tubes. The lower two courses are similarly staggered and have spaces between the tubes of approximately one-eighth inch. The vertical spacing between the courses is approximately three-eighths of an inch. In the present embodiment, 116 heating tubes 70 are employed to form a tube bundle 66 having a 35 inch width.

The parameters of tube size, spacing and number of courses can be varied according to the requirements of the type of extract being melted. However, the tubes in the tube bundle 66 must be arranged such that the fines deposited on the tubes from above can find no straight or substantially straight path through the tube bundle without directly contacting a heating tube, as seen in the right portion of FIG. 5.

The melted extract drips from the heating tubes 70 and is collected in the catch tank 58. The catch tank 58 (FIG. 3) is attached to the melting section in the same manner as the hood 52.

An air exhaust line 84 (FIG. 2) extends from the interior of the catch tank 58 into the cold room 28. The purpose of the exhaust line 84 is to allow the air which conveys the fines to the hood 52 through line 50 to escape from the melter 20. The exhaust line discharges back into the cold room 28 from where it originates (FIG. 1), effecting a reduction in the refrigeration load of the cold room. The outlet of the line 84 is covered with a dust bag 86. The bag 86 is constructed of a burlap type of material which allows the air to pass through while retaining any fines which may have passed through the melting section.

The end of the exhaust line 84 which extends into the catch tank 58 is covered with a shield 88 (FIGS. 2 and 3). The shield prevents entry of the melted extract into the exhaust line 84 as the extract drips from the melting tubes 70.

The melted fines extract is returned to the extract tank 24 through gravity feed line 60.

Operation

The fines are supplied to the melter 20 through line 50 from the cold room at approximately −25° F. As the fines fall through the hood 52, they are deposited on the tube bundle 66. The tube bundle acts as a grating and supports the unmelted fines.

Water at approximately 60° F. is supplied to the inlet header pipe 80 and hence to the heating tubes 70. The water flows through the tubes across the melting section and exits through the outlet manifold. Warm water is usually readily available from the refrigeration system for the cold room 28 and may be used to maintain the heating water at the desired temperature. Commonly known temperature sensing units in conjunction with mixing valves may be employed to maintain the desired water temperature automatically.

The fines are melted by conduction as they contact the heating tubes 70. This method of melting allows any air entrapped between the fines to escape, preventing foaming and eliminating the need for stirring or agitating the melted extract which then drips from the tubes 70 into the catch tank 58.

In most applications the melting of the fines by radiation is insignificant due to the low temperature of the heating fluid. The possibility of melting by convection is negligible due to the fact that approximately 4 cu. feet per minute of cold air enter the melter through the supply line 50, pass downward through the melting section, and is exhausted back to the cold room from the catch tank 58.

As soon as some of the fines are melted by the initial courses of melting tubes, the melted fines extract combines with the remaining frozen fines forming a pluglike mass. This mass or plug moves downward as the bottom of the plug is melted by the lower courses of melting tubes. The melted fines extract drips from the lower melting tubes into the catch tank 58.

The preferred embodiment, as described, illustrates the use of melting tubes 70 as heat transfer members; however, it is to be understood that other members such as plates and bars may also be employed in the melting section 56.

Although the best mode contemplated for carrying out the present invention has been herein shown and described, it will be apparent that modification and variation may be made without departing from what is regarded to be the subject matter of the invention as set forth in the appended claims.

I claim:

1. A method for continuously melting fine granules of a frozen, soluble solids bearing liquid such as coffee extract comprising the steps of supporting the granules on a tube bundle having multiple tubes that are closely spaced and arranged to act as a grating for preventing passage of the granules without contacting one of the tubes, supplying heat to the inside of the tubes in said bundle for melting only said granules directly in contact with the tubes, said heat being supplied at such a rate that the melted granules combine with partially melted granules to form a pluglike mass that is supported by the tubes but melts completely as it moves down through the grating, and supporting the pluglike mass above the melted extract to allow air retained between the surfaces of sand granules to escape without forming foam.

2. The method of claim 1 wherein said solids bearing liquid is coffee extract, and said heat is supplied at such a rate that the temperature of said solids bearing liquid never exceeds a temperature of approximately 40° F.

3. A method for continuously melting fine granules of a frozen, soluble solids bearing liquid such as coffee extract comprising the steps of suspending the granules in a moving stream of air, directing the stream of granules to a tube bundle and confining the stream to the bundle, supporting the granules by the tube bundle in a manner that insures contact of substantially all of the granules with at least one tube as the granules pass down between the tubes, supplying heat to the tubes at such a rate that the melted granules combine with partially melted granules to form a pluglike mass that melts completely as it moves down through the grating, receiving the melted granules in a tank below the tubes, and exhausting the moving air from the tank.

4. An apparatus for continuously melting fine granules of frozen, soluble solids bearing liquid such as coffee extract comprising blower means for supplying said granules in a free moving air suspension to the apparatus, hood means for receiving said air suspension of granules, an enclosure for said granules, gratinglike melting means in said enclosure for melting said granules by conduction, said melting means comprising multiple closely spaced melting tubes, said melting tubes being arranged so that the extract can find no straight or substantially straight path between said tubes without contacting said tubes, tank means connected to said enclosure for receiving melted liquid, and air conduit means in said tank means for exhausting air from said enclosure.

5. The apparatus of claim 4 comprising a granule shield between said air conduit means and said melting means.

6. The apparatus of claim 4 wherein said melting tubes are arranged in at least three horizontal rows.

7. Apparatus for continuously melting a mass of relatively small frozen, soluble solids bearing particles comprising a bank of heating tubes disposed in a closely spaced relation to provide a support surface for said particles, means for directing the particles onto said tube bank, and means for heating said tubes to melt said particles, said tube bank including a plurality of spaced upper tubes and a plurality of spaced lower tubes, said upper tubes being disposed further apart than are said lower tubes.

PO-1050
(5/69)

UNITED STATES PATENT OFFICE
CERTIFICATE OF CORRECTION

Patent No. 3,561,426   Dated February 9, 1971

Inventor(s)   THOMAS P. WHEELER

It is certified that error appears in the above-identified paten and that said Letters Patent are hereby corrected as shown below:

Column 4, line 21; change "sand" to --said--.

Signed and sealed this 11th day of January 1972.

(SEAL)
Attest:

EDWARD M. FLETCHER, JR.
Attesting Officer

ROBERT GOTTSCHALK
Acting Commissioner of Pa